Figure 16:
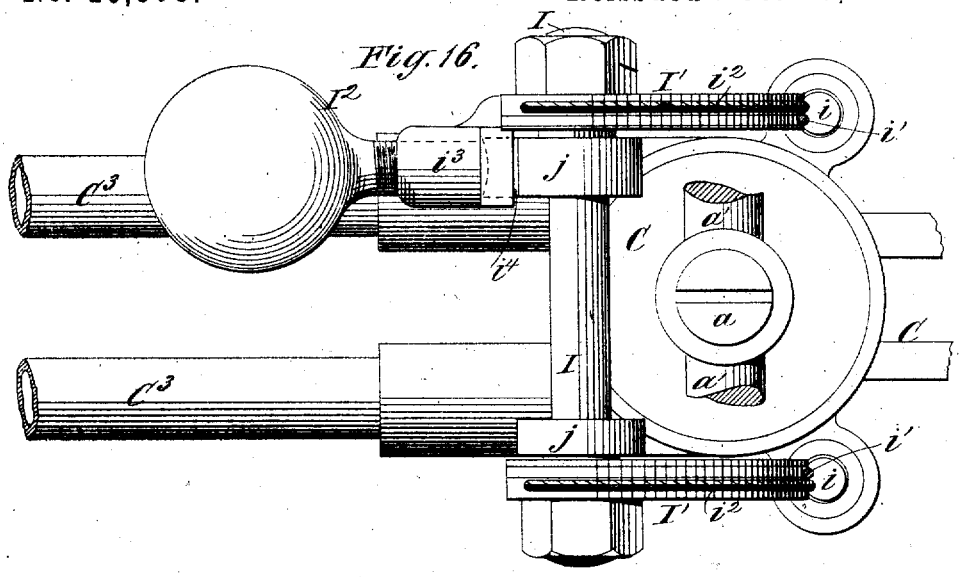

7 Sheets—Sheet 1.
C. S. LEDDELL.
VELOCIPEDE.
No. 10,673. Reissued Dec. 15, 1885.
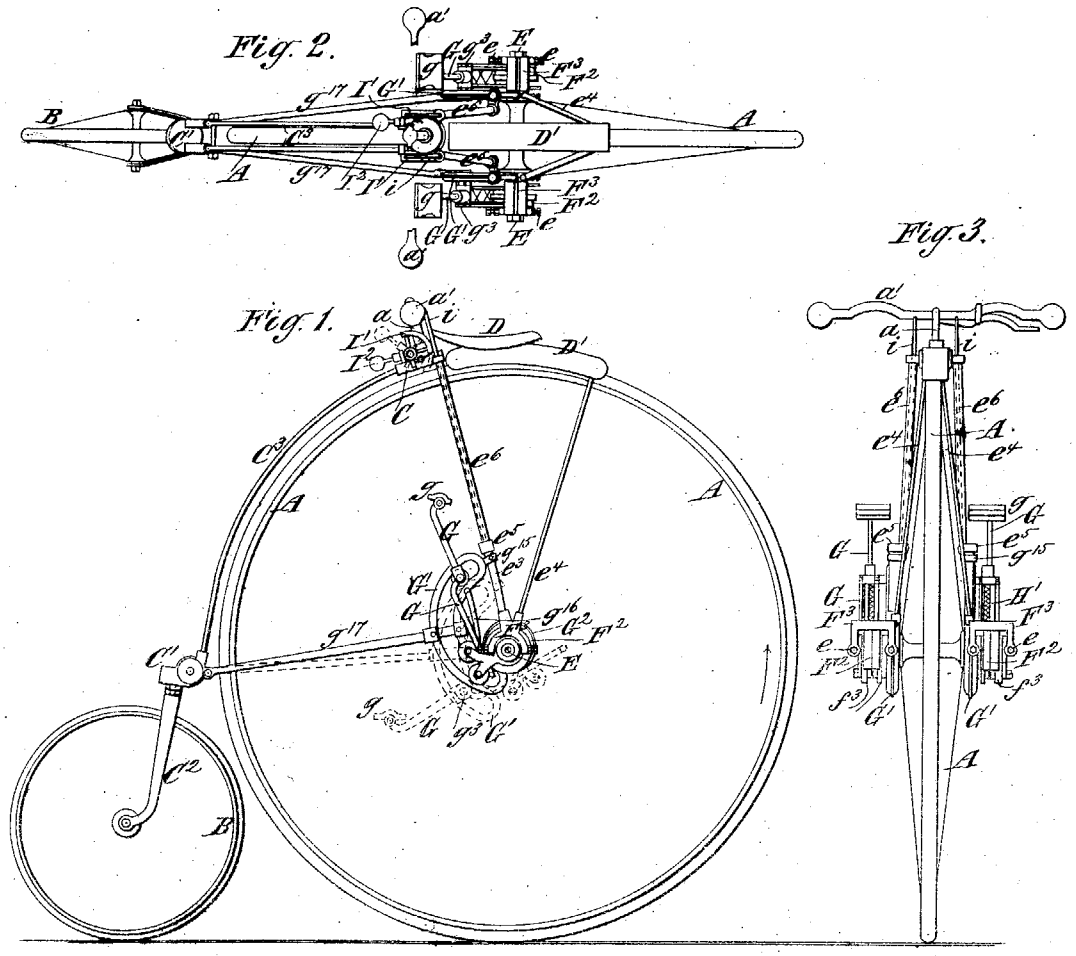
Witnesses:
Emil L. Porter.
C. L. Sundgren
Inventor:
Chas. S. Leddell
by his Attys
Brown & Hall

C. S. LEDDELL.
VELOCIPEDE.
No. 10,673. Reissued Dec. 15, 1885.
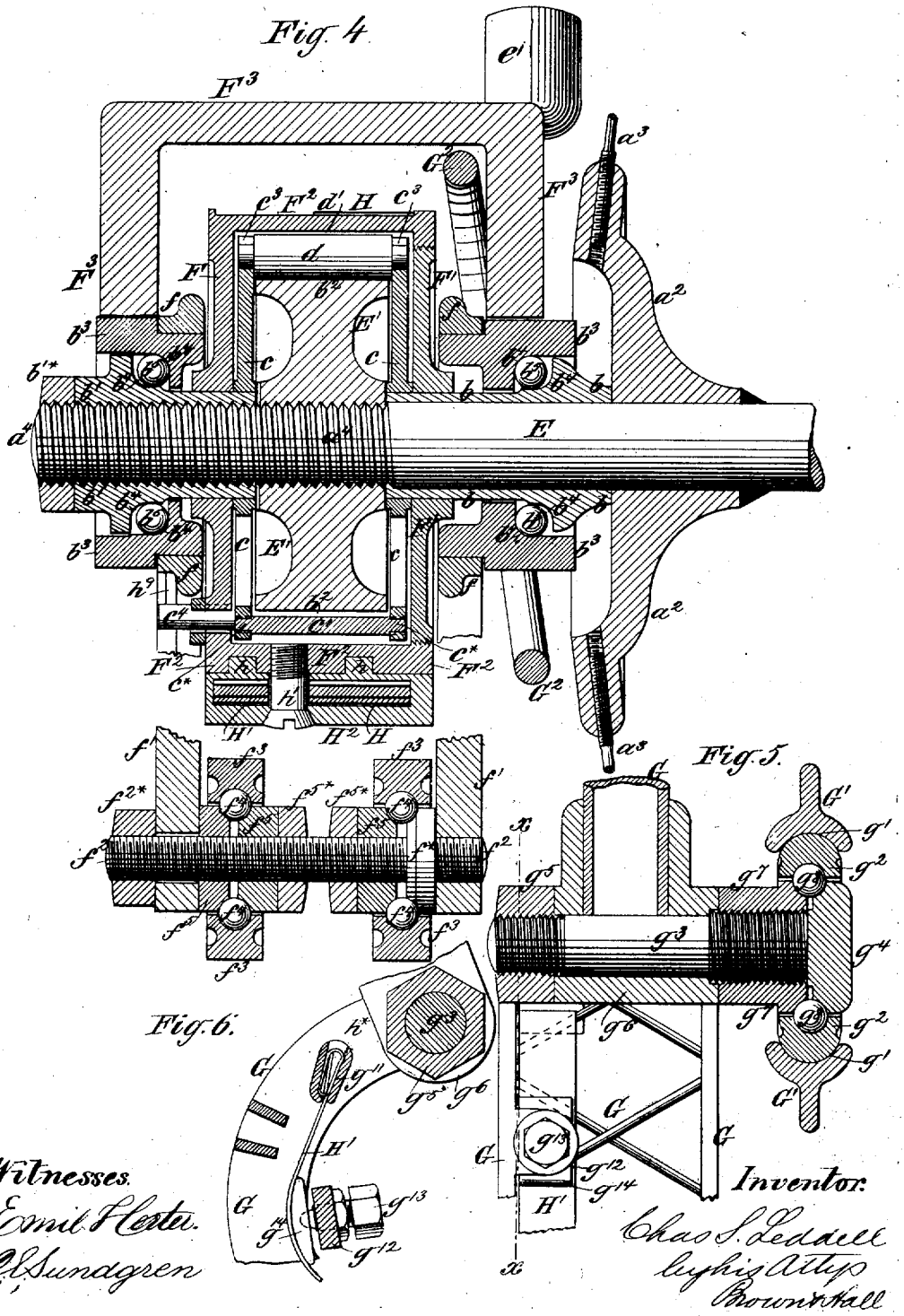
Witnesses.
Emil F. Carter.
C. L. Sundgren
Inventor:
Chas. S. Leddell
by his Attys
Brown & Hall

C. S. LEDDELL.
VELOCIPEDE.
No. 10,673. Reissued Dec. 15, 1885.
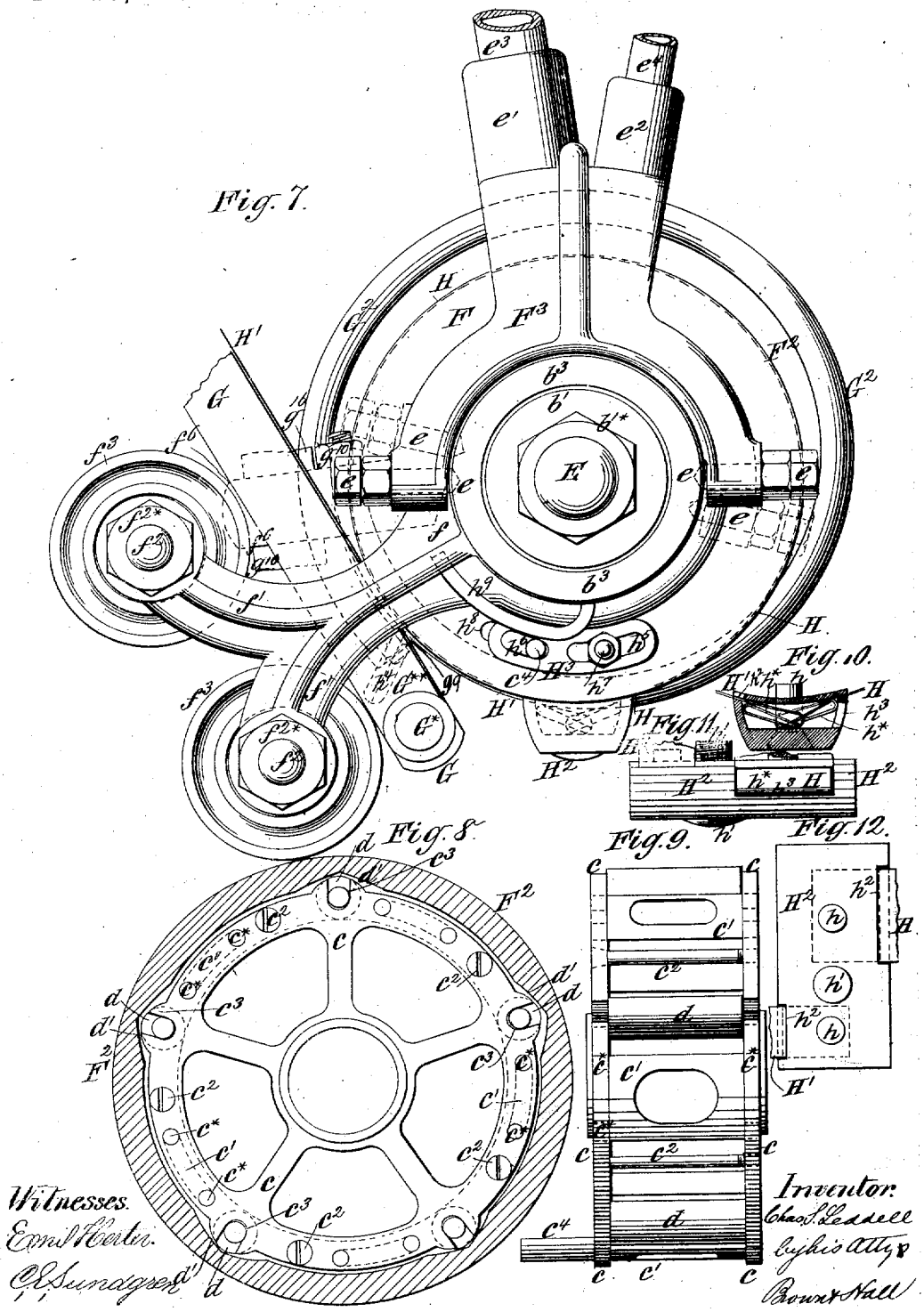

C. S. LEDDELL.
VELOCIPEDE.
No. 10,673. Reissued Dec. 15, 1885.
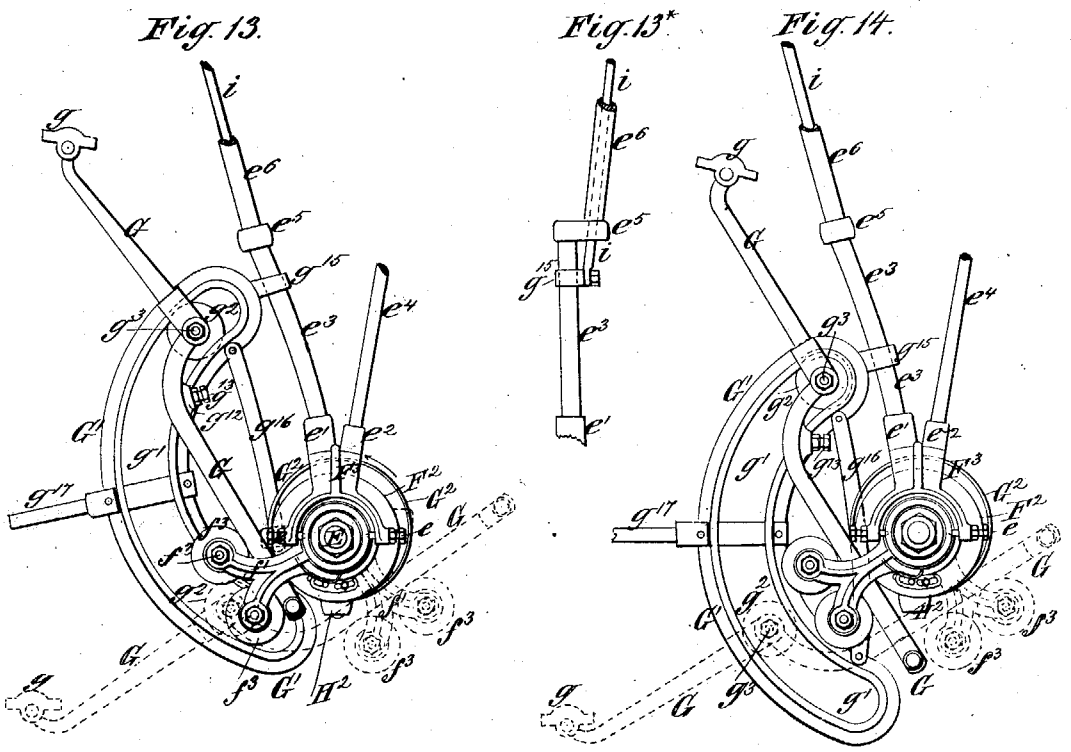
Witnesses:
Emil Hater.
C. Sunagren
Inventor:
Chas. S. Leddell
by his Attys
Brown & Hall

C. S. LEDDELL.

VELOCIPEDE.

No. 10,673. Reissued Dec. 15, 1885.

Witnesses.

Emil S. Carter.

C. L. Sundgren

Inventor.

Chas. S. Leddell by his Attys.

Brown & Hall

C. S. LEDDELL.
VELOCIPEDE.
No. 10,673. Reissued Dec. 15, 1885.
Fig. 18.
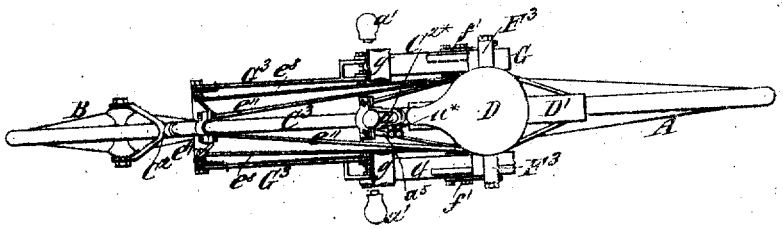
Fig. 17.
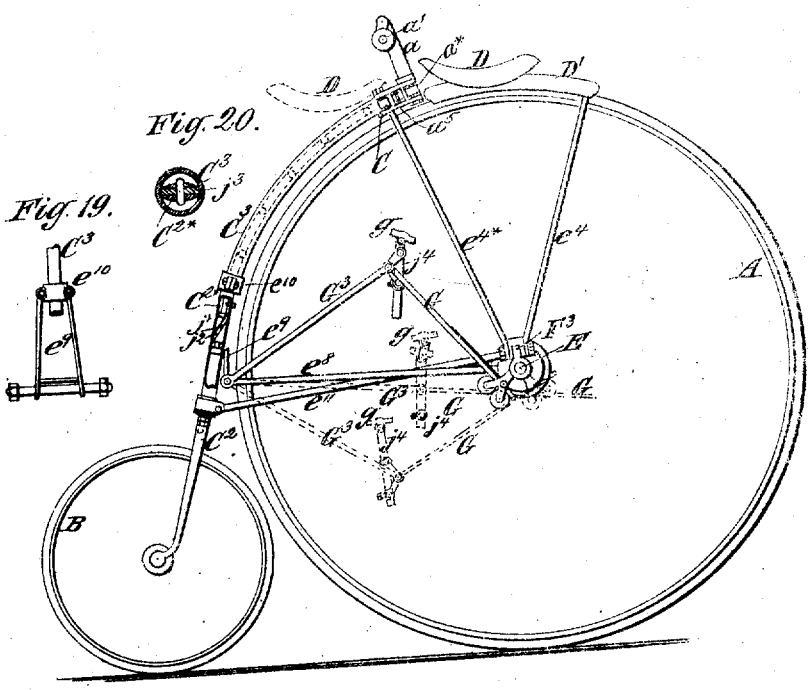
Fig. 20.
Fig. 19.
Witnesses:
Emil Hester
C. L. Sunagren
Inventor.
Chas S. Leddell
by his Attys
Brown & Hall

C. S. LEDDELL.

VELOCIPEDE.

No. 10,673. Reissued Dec. 15, 1885.

*Witnesses:*

Emil Porter.

C. L. Sunagren

*Inventor:*

Chas. S. Leddell by his Attys

Brown & Hall

UNITED STATES PATENT OFFICE.

CHARLES S. LEDDELL, OF MORRISTOWN, NEW JERSEY.

VELOCIPEDE.

SPECIFICATION forming part of Reissued Letters Patent No. 10,673, dated December 15, 1885.

Original No. 320,073, dated June 16, 1885. Application for reissue filed July 31, 1885. Serial No. 173,191.

*To all whom it may concern:*

Be it known that I, CHARLES S. LEDDELL, of Morristown, in the county of Morris and State of New Jersey, have invented a new and useful Improvement in Velocipedes, of which the following is a specification.

My invention is more particularly intended for bicycles, whether the smaller steering-wheel is in front or behind the main driving-wheel; but certain features of the invention are also applicable to tricycles and other forms of velocipedes.

The invention relates more particularly to those machines in which the main driving-shaft is operated by treadle-levers and clutch-connections, as distinguished from those machines in which the main driving-shaft is operated by crank-treadles.

An important object of my invention is to provide a clutch mechanism of simple and durable construction, and in which ample provision is afforded for taking up wear of the various parts, and by which the power exerted upon the treadle-levers will be transmitted with but little lost motion to the main driving-shaft.

Those machines in which the main driving shaft or wheel is operated by a clutch-connection have been heretofore constructed so that the treadle-levers might act throughout a long range of movement and with a long leverage for propelling the machine over level ground, and in which the parts are capable of adjustment to enable the treadle-levers to act throughout a lesser range of movement in order to obtain an increased power for propelling the machine on an upgrade. Machines of this class, so far as I have knowledge, have heretofore been constructed so that the parts might be set in two positions, in one of which they would be adapted to propel the machine at its quickest speed, and in the other of which they would be adapted for transmitting an increased power, by which the machine would be propelled at the lowest speed.

A further object of my invention is to afford provision whereby the parts of the mechanism may be readily adjusted by the rider, so as to obtain any degree of speed and power intermediate between the two extremes, and thereby afford a wider range of adjustment of power and speed than has been possible with machines of this class heretofore made.

The invention consists in novel combinations of parts and details of construction, which are hereinafter described, and pointed out in the claims.

Figure 15:
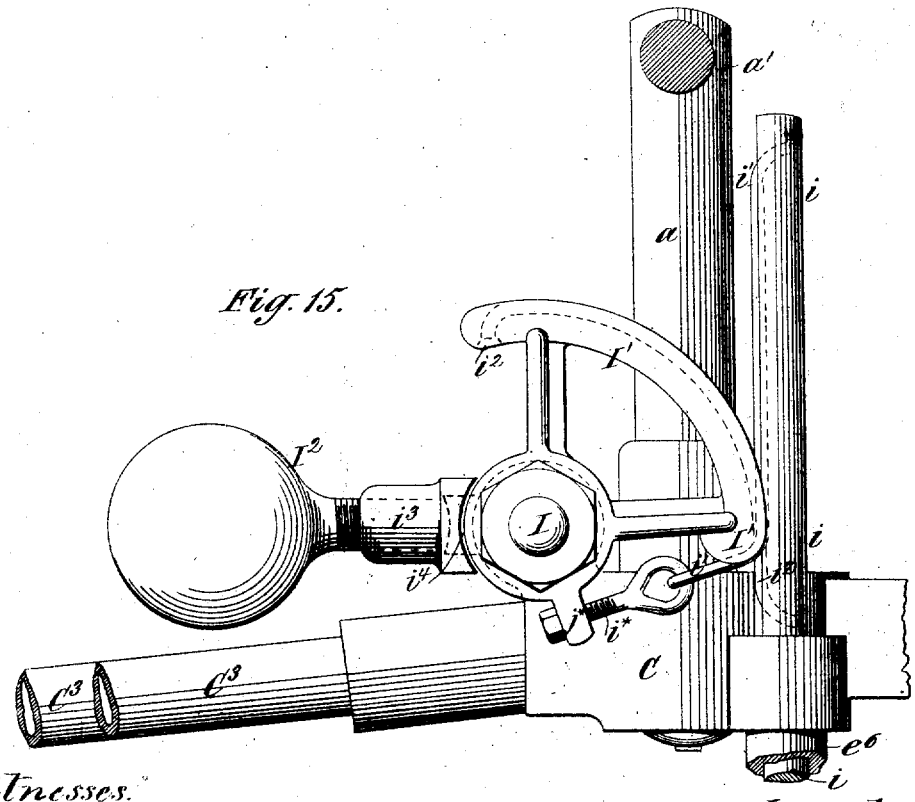
Figure 22:
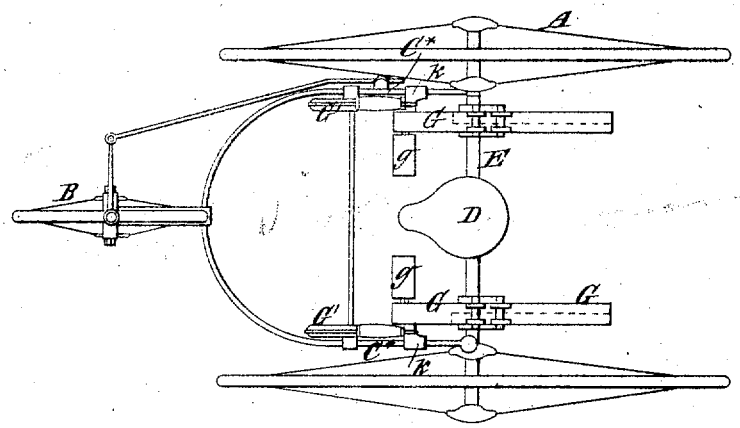
Figure 21:
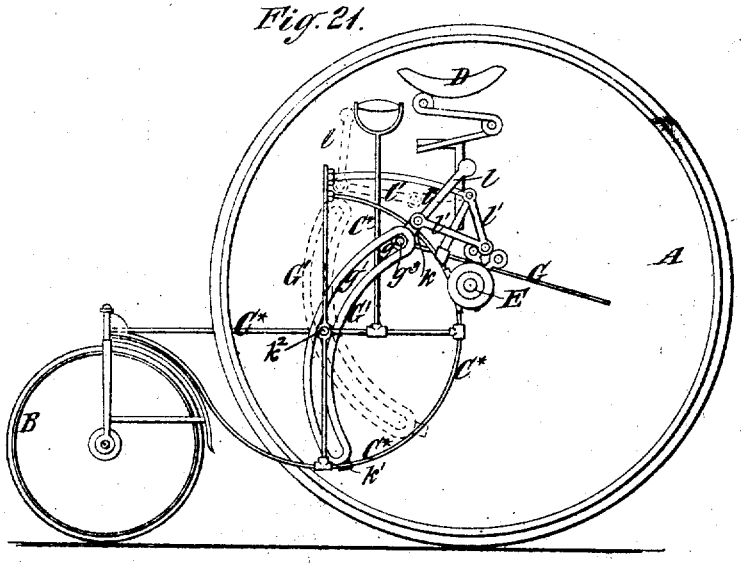

In the accompanying drawings, Figure 1 is an elevation of such parts of a bicycle as are necessary to illustrate my invention. Fig. 2 is a plan thereof. Fig. 3 is an end elevation of the machine. Fig. 4 is an axial section of the clutch mechanism, which is upon one side of the driving-wheel, and the appurtenances thereof, the same being upon a larger scale. Fig. 5 is a plan view, partly in section, upon the same scale as Fig. 4, of a portion of one of the treadle-levers and parts whereby it is guided. Fig. 6 is a sectional view upon the plane of the dotted line *x x*, Fig. 5. Fig. 7 is a side view of one of the clutch mechanisms and appurtenances upon the same scale as Fig. 4. Fig. 8 represents a sectional side view of the clutch-drum and roller-carriage, which constitute parts of the clutch mechanism, and upon the same scale as Fig. 7. Fig. 9 is a face view of the roller-carriage referred to. Fig. 10 is a sectional view of the box or securing device in which are retained the ends of flexible bands which transmit motion to the clutch-drum. Fig. 11 is a side view of the box or connection shown in Fig. 10. Fig. 12 is a plan view of such box or connection. Fig. 13 illustrates a side view of a portion of the machine upon a larger scale than Fig. 1, but showing the clutch mechanism and its appurtenances adjusted to a position for driving the machine at its quickest speed. Fig. 13* is a detail view, hereinafter described. Fig. 14 is a side view, similar to Fig. 13, illustrating the parts of the driving mechanism adjusted for driving the machine at a slower speed and with an increased power. Fig. 15 is a side view, upon a larger scale than Fig. 1, of the upper portion of the fixed frame of the machine and appurtenances whereby the parts of the driving mechanism may be adjusted to different operative positions. Fig. 16 is a plan view of the parts shown in Fig. 15, upon the same scale. Fig. 17 is a side view of portions of a bicycle embodying my invention in a slightly modified form. Fig. 18 is a plan of such bicycle. Figs. 19 and 20 are detail views, hereinafter described, illustrating portions of the bicycle shown in Figs. 17 and 18. Fig. 21 is a side view of such portions of a tricycle as are necessary to show a modification of my invention embodied therein, and Fig. 22 is a plan of the parts of a tricycle which are shown in Fig. 21.

Similar letters of reference designate corresponding parts in all the figures.

Referring first to the machine shown in Figs. 1 to 16, A designates the driving-wheel, and B the smaller steering-wheel, which may be of any suitable construction.

At the top of the wheel A is a box or frame, C, constituting a part of the main fixed frame of the machine, and from which the curved backbone extends to a box or frame, C′, in which is journaled the forked shaft $C^2$ of the steering-wheel B. The curved backbone may be composed of a tube or tubes, $C^3$, which conform in shape to the circumference of the main driving-wheel A, and which are connected at opposite ends with the box or frame portions C C′.

In the box or frame portion C of the main frame is mounted a steering-shaft, *a*, and the connections for transmitting motion from this steering-shaft to the forked shaft $C^2$ of the steering-wheel B may be passed through the tube or tubes $C^3$ of which the hollow backbone is composed. Such an arrangement of the steering-connections is shown and described in my Letters Patent No. 306,498, granted October 14, 1884, and is not here claimed. The steering-shaft *a* has connected with it a steering-handle or cross-piece, *a*′, whereby it may be turned as desired.

D designates the rider's seat, which is mounted above the wheel-guard D′, as shown in Figs. 1 and 2.

The general arrangement of parts whereby in this example of the invention rotary motion is imparted to the driving shaft E of the wheel A will be understood from Figs. 1, 2, and 3; but for a better understanding of the construction and manner of combination of these several parts reference may be had to Figs. 4 to 16, inclusive.

I have represented in Fig. 4 one end portion of the main shaft or axle E and one of the flanges $a^2$, which constitute the wheel-hub, and from which extend wire spokes $a^3$. Upon a portion of the shaft E which projects beyond the flange $a^2$ is mounted one clutch mechanism, and it will be understood that a mechanism similar in all respects is mounted upon the other end of the shaft. (Not here shown.) Like description applies to both clutch mechanisms. The end portion of the shaft E is screw-threaded, as represented at $A^4$. Upon the portion of the shaft adjacent to the flange $a^2$ is a thimble or sleeve, *b*, which may be driven thereon, and near the outer end of the shaft is a second thimble or sleeve, *b*′, screwed thereon. Between these two thimbles *b b*′ is a drum or cylindric hub, E′, which is screwed upon the shaft E, and the periphery of which presents a true cylindric surface, $b^2$. This hub or cylinder is inclosed by a roller carriage or frame of skeleton construction, and outside the roller carriage or frame is a clutch-drum, hereinafter described.

The roller carriage or frame consists of two heads or disks, *c*, which are bored to fit the exterior of the thimbles or sleeves *b b*′, and which are connected by bridge-pieces *c*′, extending between them and holding them at the proper distance apart. The bridge-pieces *c*′ have teats or projections *c**, which fit holes in the heads or disks *c*, and the two heads or disks are secured together by screws $c^2$, inserted through one of them and screwed into the other, as best shown in Figs. 8 and 9. The screws $c^2$ serve to bind the two heads or disks *c* together, and the pieces *c*′ constitute spacing pieces or blocks to hold the heads or disks at the proper distances apart.

In the roller-carriage above described are mounted a number of rollers, *d*, five being here shown. These rollers are arranged at intervals around the periphery, and their journals fit in notched bearings $c^3$ in the heads or disks *c* of the roller frame or carriage. The rollers *d* rest upon the periphery of the hub or cylinder E′, and their bearings $c^3$ are so formed as to permit of their movement slightly outward and inward, the journals of the rollers being free from the bottoms of notched bearings $c^3$, as shown in Fig. 8.

The clutch drum or barrel has two heads, F F′, and a cylindric peripherical portion or rim, $F^2$. As here shown, the head and rim F $F^2$ are cast integral with each other, and the head F′ is screwed into the rim $F^2$, as shown in Fig. 4, thus providing for placing a closed clutch drum or barrel over the roller-carriage after the latter is secured in position. The two heads F F′ are bored out to fit the thimbles or sleeves *b b*′, and can turn thereon. In the inner surface of the rim or peripherical portion of the clutch-drum are notches *d*′, which have inclined surfaces, as shown in Fig. 8, and each of which receives one of the friction-rollers *d*. The movement of the clutch drum or barrel F F′ $F^2$ in one or the other direction will cause one or other of the inclined surfaces of the notches or seats *d*′ to bear against the rollers *d* and force them against the hub or cylinder E′, and by the further movement of the drum or barrel the rollers will be clamped between the said inclined surfaces and the periphery of the hub E′, and will cause the clutch drum or barrel, the roller-frame, and the cylinder or hub E′ with the shaft to which it is secured to travel in the same direction.

Upon each side of the clutch drum or barrel above described is a ring or annular box, $b^5$, which surrounds the sleeves or thimbles *b b*′, as best shown in Fig. 4, but also in Fig. 7. The sleeves or thimbles *b b*′ and the annular boxes $b^3$ are provided with annular or concave surfaces $b^4$, and between each thimble or sleeve and its box are arranged a number of spherical rollers, $b^5$, and these rollers, with the concave surfaces on which they seat, constitute roller-bearings for the shaft E and its thimbles or sleeves $b$ $b'$.

$F^3$ designates a yoke or fork of open construction, which partially incloses the clutch above described, and the two sides of which embrace the boxes $b^3$, as most clearly shown in Fig. 7, but also in Fig. 4. In the ends of each fork $F^3$ are set-screws $e$, the ends of which enter conical bearings in the box $b^3$, and by which the boxes are held against turning.

The fork or yoke $F^3$ is formed at the side adjacent to the wheel, or the inner side, with screw-threaded sockets $e'$ $e^2$, into which are inserted tubes or rods $e^3$ $e^4$, as shown in Figs. 1 and 7. The tube or rod $e^3$, as shown in Fig. 1, is curved slightly in a vertical plane parallel with the wheel A, and at its upper end is screwed into a head or coupling, $e^5$, from which a tube, $e^6$, extends upward to the box or frame portion C at the top of the driving-wheel. The lower end of the tube $e^6$ is set inward slightly from the upper end of the tube $e^3$, as shown most clearly in Figs. 3 and 13*, and the tubes $e^3$ $e^6$ serve as side portions of the main frame, and also an additional purpose, hereinafter described.

From the above description it will be understood that the main frame of the machine is, through the forks or yokes $F^3$ and the set-screws $e$, supported by the boxes $b^3$, which constitute a part of the roller-bearings.

The end of the outer thimble or sleeve, $b'$, may be of polygonal form, so that a wrench may be applied to it for turning it, and outside this thimble or sleeve is a lock-nut, $b'^*$. It will be understood that if the thimbles or sleeve $b'$ is turned in a direction to screw it onto the shaft it will tighten the roller-bearing between it and its box $b^3$, and, through the yoke or fork $F^3$, will move the inner box, $b^3$, inward and so tighten up the inner roller-bearing. Upon the ends of the boxes $b^3$, which project within the yoke $F^3$, are fitted two rings or frames, $f$, the form of which is best shown in Figs. 4 and 7, each ring or frame having a projecting arm, $f'$, bifurcated near its outer end, as shown in Fig. 7. The outer ends of the arms $f'$ of the two rings or frames $f$, which are on opposite sides of the clutch, are connected by rods or studs $f^2$, each of which carries anti-friction rollers $f^3$. The arrangement of the roller $f^3$ on each rod or stud $f^2$ will be best understood from Fig. 4. The rod or stud $f^2$ has at one end a fixed collar, $f^{2*}$, and is screwed tightly into the arm $f'$ of the inner frame $f$, and projects loosely through a hole in the arm $f'$ of the outer frame $f$, a nut, $f^{2**}$, being applied to its outer end. Each guide wheel or roller $f^3$ is supported by spherical rollers $f^4$, which form a roller-bearing therefor, and these rollers $f^4$ work upon a seat formed by nuts applied to the rod $f^2$. The spherical rollers $f^4$ for one wheel $f^3$ have their seat upon the fixed collar $f^{2*}$, and a nut or collar, $f^5$, applied to the rod or stud $f^2$, and secured against turning thereon by a lock-nut, $f^{5*}$.

From the above description it will be seen that the nuts or screw-threaded collars $f^5$ and their lock-nuts $f^{5*}$ provide for readily tightening the roller-bearings of the guide wheels or rollers $f^3$, and enable the latter to turn with but little friction.

G designates a treadle-lever, which is of skeleton construction, as shown in Fig. 5, and which is of a size to slide lengthwise between the peripheries of the bearing-rollers $f^3$ and the periphery of the clutch drum or barrel $F^2$. To the upper end of the treadle-lever G is applied a foot-pedal, $g$, and the fulcrum of the treadle-lever is supported in a guide, G'. (Best shown in Figs. 1, 5, 13, and 14.) This guide G', as here shown, contains a curved or arc-shaped slot, $g'$, the inner faces of which are concaved or rounded transversely to its length, as shown best in Fig. 5. In Fig. 5 I have also shown the connection of the treadle-lever G with the guide G', and the manner in which it is guided thereby. Within the guide is fitted a wheel or roller, $g^2$, the periphery of which is or may be rounded transversely to fit the faces of the slots $g'$, which are here shown as concave, and through this roller or wheel $g^2$ is passed a pin or bolt, $g^3$, having at the inner end a head, $g^4$, and a nut, $g^5$, applied to its outer end. The treadle lever G also has an eye, $g^6$, which fits upon the pin $g^3$. Upon the pin $g^3$, adjacent to its head $g^4$, is screwed a nut or collar, $g^7$, and between a concave seat formed by the nut or collar $g^7$ and the head $g^4$, and the concaved seat in the wheel or roller $g^2$, are a series of spherical rollers, $g^8$. These rollers form an anti-friction bearing, on which the guide roller or wheel $g^2$ may turn as it works in the slotted guide G', and this roller-bearing may be tightened up by tightening the nut or collar $g^7$. The nut $g^7$ may be tightened to lock upon the pin $g^3$ the parts through which it passes, and it will then be understood that pressure upon the foot-pedal $g$ will cause the treadle-lever to move lengthwise between the guiding wheels or rollers $f^3$ and the periphery of the drum $F^2$, the roller $g^2$ running in the slotted link to permit of such movement. In this way the treadle-lever G will be moved from the position shown in bold outline, Fig. 13, to the position shown in dotted outline therein, and the frame and rollers $f$ $f'$ $f^3$, which guide the treadle-lever G and hold it against the periphery of the drum $F^2$, will be swung from the position shown in bold outline, Fig. 13, to that shown in dotted outline. In order to return the treadle-lever G after such downward movement, I have represented a spring, $G^2$, which consists of a section of a spiral, and which is shown in Figs. 4 and 7. One end of this spring $G^2$ is passed through and secured by a nut, $g^9$, to the arm $f'$ of one of the rotary frames or rings $f$, and the other end of the spring $G^2$ is passed through and secured by the nut $g^{10}$ to a lug or ear, $f^6$, which projects horizontally from the inner fork of the yoke $F^3$, as shown by dotted lines in Fig. 7. Consequently it will be seen that when the rotary frame $f f'$ and rollers $f^3$ are turned from the position shown in full lines, Fig. 13, and in the direction of the arrow to the position shown by dotted lines in said figure, the spring $G^2$ will be contracted or put under tension, and consequently when the pressure of the foot is removed from the treadle-lever the expansive force of this spring will return the rotary frame $f f' f^3$, and by so doing will carry the treadle-lever G back to the position shown by full lines in Fig. 13. The lug or ear $f^6$ prevents the pivot-screws $e$ in the inner fork of the yoke $F^3$ from being placed horizontally, and they are placed at diametrically-opposite points, as shown by dotted lines, Fig. 7, in a line which is inclined slightly to the horizontal.

From the above description it will be understood that the treadle-lever G has a swinging movement on its pivot or fulcrum $g^3$, and during the swinging movement of the treadle-lever its fulcrum moves or travels along the guide G′ from end to end thereof.

In this example of the invention the treadle-lever G is connected with the clutch drum or barrel $F^2$ by two flexible connections, consisting of straps or bands H H′, which are best shown in Figs. 4, 7, 10, 11, and 12. These straps or bands may consist of phosphor-bronze, steel, or other suitable material, and their ends are secured in a suitable box or frame, $H^2$, whereby they are connected with the clutch drum or barrel $F^2$, and pass from their point of connection in opposite directions around the drum or barrel.

The box $H^2$ is a hollow skeleton structure, (best shown in Figs. 10, 11, and 12,) curved on its inner face to fit the circumference of the drum or barrel $F^2$, and provided with studs or pins $h$, which enter the drum or barrel, and a screw, $h'$, passing through it and into said drum or barrel. The ends of the straps or bands H H′ are each doubled or folded around taper plugs or bases $h^*$, and secured by riveting through them, as shown best in Fig. 10. I thus form a head piece or projection on each band which is as strong as the band itself, and without in any way weakening the band. The box $H^2$ has near one end a narrow slot, $h^2$, through which the band H is passed, but will not permit the passage of the enlarged head of the band. At the side opposite the slot $h^2$ is an enlarged opening, $h^3$, through which the enlarged head of the band may be introduced into the box. The box $H^2$ has near its other end and on opposite sides a slot, $h^2$, and an enlarged opening, $h^3$, whereby the band H′ may be introduced into and pass from the box $H^2$. The construction of this box $H^2$, as above described, is best shown in Figs. 10, 11, and 12, and when it is securely fastened to the clutch drum or barrel, as represented in Fig. 7, the bands H H′ pass therefrom in opposite directions around said drum or barrel, and are securely attached to the drum at their ends, so that a pull upon one or other of them will turn the drum or barrel in one or other direction. The band H is carried almost entirely around the circumference of the drum or barrel $F^2$, and has its end attached to the treadle-lever G at $h^4$, near the lower end of the latter, the band having formed upon that end an enlarged head like that described upon its other end, and by which it is attached to the treadle-lever. The band H′ passes from the box $H^2$ on the left side of the drum or barrel $F^2$, as shown in Fig. 7, and thence extends upward on the treadle-lever G to a point near its fulcrum $g^3$, where it is attached to it in a manner best shown in Figs. 5 and 6. The end of the band H′ has an enlarged head, composed of blocks $h^*$, around which it is folded, and to which it is riveted, and this enlarged head is held in a socket, $g^{11}$. I have shown the treadle as provided at one side with an inwardly-extending lug or projection, $g^{12}$, through which is inserted a set-screw, $g^{13}$, and beneath which is a saddle-piece, $g^{14}$, on which the point of the set-screw impinges, and which bears upon the band H′. It will therefore be understood that by tightening the set-screw $g^{13}$ and pressing the saddle-piece $g^{14}$ upon the band H′ said band will be tightened to take up any stretch or wear therein, and as the bands H H′ pass around the clutch drum or barrel in opposite directions, the taking up of the slack in the band H′ will tighten both of said bands.

From the above description it will be understood that when the treadle-lever G is moved downward from the position shown in full lines, Fig. 13, to that shown by dotted lines therein, the draft upon the band H will turn the clutch drum or barrel $F^2$ in the direction of the arrow, Fig. 13, and will, through the clutch mechanism before described, turn the shaft E and driving-wheel A in the same direction. The spring $G^2$ will thus be put under tension, and as soon as the pressure on the treadle-lever is relieved will move the treadle-lever upward to its first position, and by the draft upon the band H′ will produce a reverse rotation of the clutch drum or barrel F.

On the lower end of the treadle-lever G is a projection, G*, which forms a stop to limit the upward movement of the lever, and also serves as a step for mounting the machine. A cushion or block of rubber, G**, may be placed above the projection G*, to deaden its striking force on the frame $f f'$. I also prefer to employ an adjustable connection between the side of the roller-frame within the clutch-barrel and the clutch-barrel itself, as shown in Fig. 7.

$H^3$ designates a segmental link or plate, having in it slots $h^5$ $h^6$. In the side of the clutch barrel or drum is fixed a stud-bolt, $h'$, and by tightening a nut thereon the link or plate $H^3$ may be held in any position desired relative to the barrel or drum. In the side of the barrel or drum is also a segmental slot, $h^8$, through which passes a pin, $c^4$, projecting from the side of the center roller-frame, and said pin passes through and works in the slot $h^8$ in the plate or link $H^3$. The plate or link may be so set relatively to the clutch drum or barrel that it will permit either one of the inclined sides of the notches $d'$ to act upon the clutch-rollers $d$, but will not permit the opposite sides of the notches to come in contact with said rollers, and hence by shifting the plate or link $H^3$ in one or other direction the clutch mechanism may be set for moving either forward or backward.

I have also shown in Fig. 7 a small wire spring, $h^9$, which bears upon the pin $c^4$, and exerts enough friction thereon to prevent the roller-frame from turning sufficiently to bring the rollers $d$ into operation, and to permit of the machine being rolled backward when there is no pressure on the treadle-levers.

By the movement of the treadle-lever G from the position shown in bold lines in Fig. 13 to that shown in dotted lines in said figure, the clutch drum or barrel $F^2$ will be rotated a distance corresponding to the change in position between the roller-supporting rings or frames $f$ $f'$ from the position shown in bold outline, Fig. 13, to that shown in dotted outline, and said drum or barrel will be turned a further distance equal to the movement of the treadle-lever G lengthwise between the rollers $f^3$ and the drum or barrel $F^2$. In other words, the drum or barrel $F^2$ will be turned about one quarter a revolution by the movement of the treadle-lever from one position to the other, (shown in Fig. 13,) and will receive an additional movement, due to the lengthwise movement of the treadle-lever G downward and inward between the rollers $f^3$ and the drum or barrel $F^2$. This increase of motion given to the clutch mechanism is due to the slotted guide G′ being eccentric to the driving-axle E, and to the fact that as the treadle-lever is pushed downward its fulcrum $g^3$ moves inward toward the axle E.

The guide G′, when adjusted to the position shown in Fig. 13, is adapted for the quickest speed of the machine.

The guide G′ has at its upper end an eye, $g^{15}$, and also has a rod or arm, $g^{16}$, connected to it at its upper and lower ends, and working through an eye in the ear $f^6$, projecting from the yoke $F^3$. The guide G′ is also supported by a rod or brace, $g^{17}$, extending from the box or frame C′, and attached to the guide at about the middle of its length. The guide is thereby supported so that it may be raised and lowered and maintained in its proper plane. The rod $g^{17}$ also answers as a part of the frame. If the guide is lowered to the position shown in Fig. 14, in which its slot will be concentric with the axle E, then the treadle-lever G will have no lengthwise movement between the rollers $f^3$ and the clutch drum or barrel $F^2$, and said clutch drum or barrel will only receive about one-quarter rotation, or only that due to the change in position of the treadle-lever from that shown in full lines, Fig. 14, to that shown by dotted lines in said figure. This will adapt the machine for operation with greater power and at a less speed, as is required on an ascending grade.

Not only can the guide G′ be adjusted to the two positions shown in Figs. 13 and 14, but it may be adjusted to any intermediate position, and as the guide is moved from the position shown in Fig. 13 to that shown in Fig. 14, the speed will be decreased and power gained in a degree corresponding to the change in position of the guide.

I will now describe the mechanism for adjusting and holding the guide G′ in different positions, such mechanism being shown in Figs. 1, 2, 3, 13, 13*, 14, 15, and 16.

As before stated, the tubes $e^6$ have their upper ends secured in the box or frame portion C, and have their lower ends secured in the coupling-pieces $e^5$, which connect the tubes $e^3$ $e^6$. Through these tubes extend rods or wires $i$, attached at their lower ends to the ears or eyes $g^{15}$ on the guides G′, as shown in Fig. 13*, and extending upward above the tubes $e^6$, and above the box or frame portion C, as best shown in Fig. 15. The box or frame portion C is provided with upwardly-extending lugs or bearings $j$, in which is journaled a cross pin or shaft, I, as shown in Fig. 16. To the opposite ends of the shaft I are attached segmental frames or sectors I′, which are made fast to the shaft, and have grooved or recessed faces.

To the portion of each rod $i$ which projects above the box C are attached two wires or flexible connections, $i'$ $i^2$. The wire or flexible connection $i'$ is attached near the upper end of the rod, and rests in a groove formed lengthwise of the rod, and its lower end is attached by an eyebolt, $i^*$, to the ear $j^*$, projecting from the sector or frame I′. The flexible connection $i^2$ also rests in a groove in the rod $i$, and is attached to the rod at one end, its other end being attached to the upper portion of the sector I′.

Connected with one of the sectors I′, as shown in Fig. 16, is a socket, $i^3$, into which is screwed a handle and clamping-screw, $I^2$, and the end of this screw bears against a saddle-piece, $i^4$, the face of which is concaved to fit the exterior of one of the bearings or lugs $j$. During the operation of the machine on level ground, or whenever desired, the screw-handle $I^2$ is tightened, so as to force its saddle $i^4$ against the bearing $j$, and thereby hold the rods $i$ and the guides G′ in fixed position. On reaching an ascending grade the rider may take hold of the handle $I^2$, and by unscrewing it release the saddle piece $i^4$ from pressure, and may by said handle then turn the shaft I and the sectors I′, raising or lowering the rods $i$ and the guides G′ to the desired degree. By then turning the handle $I^2$ the saddle-piece $i^4$ is clamped upon the bearing $j$, thereby securing the rods $i$ and guides $G'$ against accidental movement. It will therefore be seen that the handle $I^2$ serves both as the means of adjusting the guides $G'$ and as the means of securely clamping them in position.

In Figs. 17 to 20, inclusive, I have illustrated a modification of my invention, which I will now describe. A B designate the wheels; C the upper box or frame portion, from which extends a curved hollow backbone, $C^3$, composed of a single tube. D designates the saddle, and D' the wheel-guard on which it is supported. E designates the main driving-shaft, having applied to it clutch mechanism substantially like that before described. From the yoke $F^3$, by which the main frame is supported on the roller-bearings, arms or frame portions $e^4$ $e^{4*}$ extend upward above the wheel, and rods or braces $e^8$ extend rearward, and are connected by a link or swinging suspension device, $e^9$, with the collar $e^{10}$, clamped to the backbone $C^3$, as shown in Fig. 19. The steering-wheel shaft and fork $C^2$ are connected by a brace-rod, $e^{11}$, with the yoke $F^3$. The steering-shaft $C^2$ extends upward into the lower end of the backbone $C^3$, and is connected by a pin, $j'$, and spiral slot $j^2$ with the curved rod or shaft $C^{2*}$, extending through the backbone. The rod or shaft $C^{2*}$ is provided with anti-friction rollers $j^3$, which are pivoted in slots in the rod, as shown in Fig. 20, and which prevent friction between the rod and the tube $C^3$ when the rod is moved endwise. By an endwise movement of the rod $C^{2*}$ the slot $j^2$ will be caused to act on the pin $j'$, and will thereby turn the steering-fork $C^2$ and steering-wheel B. The steering-shaft $a$, which is surmounted by a handle, $a'$, fits closely in the end of the rod $C^{2*}$, which projects beyond the backbone $C^3$, and has arms $a^*$, which are connected by a link, $a^5$, to a fixed point on the box or frame portion C. The pivoted connection between the arms $a^*$ and the link $a^5$ forms a fixed fulcrum for the steering-shaft, and by pressing upon one end or the other of the handle $a'$ the rod $C^{2*}$ will be moved lengthwise in one direction or the other, and will shift the steering-wheel B and fork $C^2$.

In this example of my invention the treadle-lever G is pivoted at its upper end to a second lever, $G^2$, supported at its opposite end by the link or suspender $e^9$, and to the pivotal connection of the levers G $G^3$ is attached a treadle-bar, $j^4$, surmounted by a pedal, $g$. By the action of the feet upon the pedals $g$ the levers G $G^3$ will be moved from the position shown in full lines, Fig. 17, to the position shown in which they are in line, as shown by dotted lines in said figure.

If desired, the driver's seat may be arranged over the backbone, as shown by dotted lines, Fig. 17, or on the opposite side of the steering-shaft to run with the large wheel in front, and in such case the levers G $G^3$ will by the operation of the pedals be moved from the position shown by dotted lines, Fig. 17, in which they are in line, to the lowermost position shown by dotted lines in said figure.

In Figs. 21 and 22 I have represented as much of a tricycle as is necessary to illustrate my invention applied thereto. A designates the driving-wheels, and B the steering-wheel. G' designates a slotted arc-shaped guide, which is adjustably supported at $k$ $k'$ upon curved portions of the frame $C^*$, and is here shown as pivoted at $k^2$ to a part of the frame $C^*$. With the upper end of the guide G' is connected a handle and lever, $l$, and links $l'$, forming a toggle-joint. D designates the seat, and G the treadle-lever and movable fulcrum $g^3$, which works in the guide G'. The pedals $g$ are in this case placed directly upon these movable fulcra, and by the movement of the pedals the treadle-levers G are caused to operate a clutch mechanism similar to that before described, and mounted on the driving-axle E. By the handle $l$ and the toggle-levers $l'$ the guides may be turned on their pivots $k^2$ from the position shown in full lines in Fig. 21 to that shown by dotted lines in said figure, and as the toggle-links $l'$ are then nearly straight or in line they will sustain the slotted guides G' in their new position. By means of the handle $l$ and the links $l'$ the slotted guides G' may be shifted to and held in any position between those shown by full and dotted lines in Fig. 21, thus providing for decreasing the speed and increasing the power as may be desired. By moving the guide G' down still farther from the position shown in Fig. 14, or so that the center from which the arc of the guide is struck is below the driving-axle E, the speed at which the machine may be driven will be still further decreased, and by moving the guide downward still farther the treadle-levers may be made to turn the wheel in the reverse direction. It will be observed that the portion of the treadle-lever G below its fulcrum $g^3$ is curved or bent; but it might be straight. One advantage of having it curved is that the treadle-lever G then has less pressure on the circumference of the clutch-drum $F^2$.

Inasmuch as the bearing which the fulcrum of the treadle-lever G has in the guides G' is on the inner side of the lever, there would be a tendency to throw the lower end of said lever outward. The arrangement of the returning band H' on the outer side of the lever counteracts this tendency, for by tightening this band the outer end of the fulcrum-pin $g^3$ will be pulled down and the lower end of the lever thrown inward.

Although only shown in connection with velocipedes, it is obvious that my improved clutch mechanism and lever-motion may be used with other power-machines.

I am aware that clutches which comprise a clutch-drum to which a reciprocating rotary motion is imparted, and devices whereby motion continuously in one direction is transmitted from said drum to an axle or shaft, are old and well known; and I am also aware of United States Letters Patent to Deering, No. 309,933, granted December 30, 1884, which shows and describes a clutch in which there are employed series of balls or spherical rollers which cramp themselves between a circular hub or center and inclined seats on the interior of a clutch-drum having a reciprocating rotary motion.

I do not claim, broadly, a clutch of the kind above referred to as old, as of my invention; nor do I desire to include in my invention the specific construction of clutch shown in Deering's patent.

I am also aware that it is not new to employ in connection with pedo-motive vehicles hand-levers and treadle or foot-levers which have adjustable fulcrums, or the fulcrum-points of which may be adjusted or set so as to give their arms different proportional lengths; and I do not desire to include such adjustable levers in my invention. My treadle-levers G are not adjustable in the way above described, and the relative length of their two arms always remains invariable; but whenever operated their fulcrums are moved along the curved or arc-shaped guides G′, and as such guides are or may be set eccentric to the axle or wheel-center, I obtain a rotation of the clutch-drums which is the combined result of the oscillation of the levers G on their fulcrums and the lengthwise movement of the levers between the clutch-drums and their supporting-rollers $f^3$.

What I claim as my invention, and desire to secure by Letters Patent, is—

1. In a velocipede, the combination, with a driving-wheel and bearings, of a clutch mechanism consisting of a cylindric hub turning with the wheel, a surrounding clutch-drum provided with inclined surfaces on its inner circumference, and a roller-frame in which are journaled friction-rollers, which are arranged opposite the inclined surfaces of the drum and bear on the said cylindric hub, a treadle-lever, and a flexible connection attached at one end to the drum, passed around the drum, and attached at the other end to said lever, whereby the movement of the lever will produce a pull on the connection to turn the clutch-drum, substantially as herein described.

2. In a velocipede, the combination, with a driving-wheel and bearings, of a clutch mechanism consisting of the cylindric hub turning with the wheel, the roller-frame and rollers, and the clutch-drum provided with inclined surfaces on its inner circumference, as described, a treadle-lever, flexible connections attached to the clutch-drum, passing around the same in opposite directions and attached to the treadle-lever near opposite ends thereof, and a spring for returning the lever and clutch-drum after operation, substantially as herein described.

3. In a velocipede, the combination, with the axle E, of a clutch mechanism consisting of the hub fast on said axle, the roller-frame and rollers, and the clutch-drum, flat metallic bands H H′, attached to and passed around the drum in opposite directions, a treadle-lever to which said bands are attached, and a spring whereby the treadle-lever and clutch-drum are returned after operation, substantially as herein described.

4. In a velocipede, the combination, with the axle E, of a clutch mechanism consisting of a hub fast on the axle, the roller-frame and rollers, and the clutch-drum, flexible connections attached to and passing around the drum in opposite directions, a treadle-lever to which said flexible connections are attached, and a coiled spring, $G^2$, whereby the treadle-lever and clutch-drum are returned after operation, substantially as herein described.

5. The combination, with the driving-axle E, of a clutch mechanism comprising the clutch-drum $F^2$ with its cylindric periphery, the treadle-lever G, the flat metal bands H H′, having enlarged heads or end portions, the box $H^2$, attached to said drum and having at opposite sides a large opening, $h^3$, for the introduction of the head of a band, and a narrow slot, $h^2$, for the passage of the band itself, the two bands being passed in opposite directions around the drum and attached to the lever, all substantially as herein described.

6. The combination, with the drum $F^2$ and the treadle-lever G, of the flexible connections H H′, passed in opposite directions around the drum and attached at opposite ends to the drum and lever, a tightening-screw, and saddle $g^{13}$ $g^{14}$, applied to one of the connections H H′, for taking up slack in both connections, substantially as herein described.

7. The combination, with the axle E and its fixed hub E′, of the roller-frame comprising heads or disks $c$, having notched bearings $c^3$, and rollers $d$, journaled therein, the clutch-drum $F^2$, having inclined surfaces upon its inner circumference, a treadle-lever, G, and straps or bands passing in opposite directions around the drum and attached at opposite ends to the said drum and lever, substantially as herein described.

8. The combination, with the axle E and the hub E′ fast thereon, of the roller-frame and its rollers $d$, and the stud $c^4$, projecting from the side thereof, the clutch-drum having the slot $h^8$ in one of its heads, and the bolt $h^7$, the slotted plate or link $H^3$, secured in place by the bolt $h^7$ and receiving through it the stud $c^4$, the treadle-lever G, and connections between the treadle-lever and clutch-drum for rotating the latter, substantially as herein described.

9. The combination, with the axle E and the clutch mechanism for rotating the axle and comprising the clutch-drum $F^2$, of the rotary or oscillating frames $f$ $f'$ and their lever-supporting rollers $f^3$, the treadle-lever G, arranged between the said rollers $f^3$ and the clutch-drum, and connections between said clutch-drum and lever for rotating the drum, substantially as herein described.

10. The combination, with the rotary frames or rings $f f'$ and the screw-threaded pins $f^2$ connecting them, of the rollers $f^3$, pairs of nuts $f^5$ applied to said pins, and spherical rollers $f^4$ between said pairs of nuts and the rollers $f^3$, substantially as herein described.

11. The combination, with the axle E and the non-rotary boxes $b^3$, supported by ball-bearings on said axle, of the yoke $F^3$, connected by pivot-screws $e$ with said boxes and supporting the fixed frame of the machine, whereby both roller-bearings may be tightened by tightening the outer bearing, substantially as herein described.

12. The combination of the axle E, the sleeves or thimbles $b\ b'$, and hub E', rotating with said axle, the roller-frame and its rollers $d$, and the clutch-drum $F^2$, inclosing the hub E' and fitted to turn on the sleeves $b\ b'$, the non-rotary boxes $b^3$, supported by ball-bearings, and the yoke $F^3$, supported by said boxes, the rings or frames $f f'$, journaled on the boxes $b^3$ and provided with rollers $f^3$, the treadle-lever G, and the operating straps or bands H H', substantially as herein described.

13. The combination, with a driving wheel or shaft, of a pivoted treadle-lever having a swinging movement on its pivot or fulcrum, a guide along which the fulcrum of the lever is movable during its swinging movement, and connections, substantially as described, through which the treadle-lever during its movement along the guide in one direction transmits rotary motion to said wheel or shaft, substantially as herein set forth.

14. The combination, with a driving wheel or shaft, of a treadle-lever having a swinging movement on its pivot or fulcrum, an arc-shaped or curved guide along which the fulcrum of the lever is movable during the swinging movement of the lever, and connections, substantially as described, through which the treadle-lever during its movement along the guide in one direction transmits rotary motion to said wheel or shaft, substantially as herein described.

15. The combination, with the driving wheel or shaft and a treadle-lever and connections for operating the same, of the curved and slotted guide G' and a roller fitted to the lever-fulcrum and working in said slotted guide, substantially as herein described.

16. The combination, with a driving wheel or shaft, of a treadle-lever having a swinging movement on its pivot or fulcrum, a guide along which the fulcrum of the lever is movable during its swinging movements, supports on which the guide may be adjusted relatively to the axis of the wheel or shaft, locking devices for securing the guide after adjustment, and connections, substantially as described, through which the treadle-lever during its movement along the guide in one direction transmits rotary motion to said wheel or shaft, substantially as herein set forth.

17. The combination, with a driving wheel or shaft, of a treadle-lever having a swinging movement on its pivot or fulcrum, a guide along which the fulcrum of the lever is movable during its swinging movements, supports on which the guide is adjustable relatively to the axis of the wheel or shaft, connections extending upward from said guide to the top of the machine, and through which the guide may be adjusted by the rider, and connections, substantially as described, through which said lever during its movement along the guide in one direction transmits rotary motion to said wheel or shaft, substantially as herein set forth.

18. The combination, with a driving wheel or shaft, and a clutch mechanism for driving the same, of a lever connected with the clutch mechanism for producing the operation thereof, and a slotted arc-shaped guide, G', wherein the fulcrum of the said lever is movable, substantially as herein described.

19. In a velocipede, the combination, with a driving wheel or shaft, and clutch mechanism for driving the same, comprising a clutch-drum, of a treadle-lever having a swinging movement on its pivot or fulcrum, a guide along which the fulcrum of said lever is movable during the swinging movements of the lever, and a band passing from the lever around the clutch-drum, and through which the treadle-lever serves to rotate the drum during the movement of the lever along its guide in one direction, substantially as herein described.

20. In a velocipede, the combination, with a driving wheel or shaft, and clutch mechanism for driving the same, comprising a clutch-drum, of a treadle-lever and band passing therefrom around the drum for the purpose of rotating the drum, a guide whereon the fulcrum of said lever is movable, and by which it is guided, and devices for adjusting the guide into positions eccentric to or concentric with said driving wheel or shaft, substantially as herein described.

21. The combination, with the slotted guide G', and the treadle-lever G, of the fulcrum-pin $g^3$, a roller, $g^2$, fitting the slotted guide and having a roller-bearing support on said pin, the axle E and its clutch mechanism, and a connection between the lever and clutch-drum, substantially as herein described.

22. The combination, with the driving-axle E, and clutch mechanism thereon, of the treadle-lever G, for operating the axle through the clutch mechanism, the curved guide G', whereon the fulcrum of said lever is movable, supports whereon the guide may be raised and lowered, and rods extending upward from the guide to the top of the machine and by which the guide may be adjusted, substantially as herein described.

23. The combination, with the guide G', of the frame comprising tubular portions $e^5$ $e^6$, the portion $e^3$ serving as a support on which the guide is adjustable, and a rod, $i$, extending from the guide upward through the tubular portion $e^6$ and serving to adjust the guide upward and downward to bring it eccentric to or concentric with the driving-wheel, substantially as herein described.

24. The combination, with the guides G′ and their supports, of the shaft I, journaled in bearings $j$ at the top of the machine and having sectors I′ fixed upon it, the rods $i$, extending upward from said guides, the flexible connections $i'$ $i^2$ between said rods and sectors, and the screw-threaded handle $I^2$, serving both to turn and to lock or hold the shaft I and sectors I′, substantially as herein described.

CHARLES S. LEDDELL.

Witnesses:
C. HALL,
HENRY MCBRIDE.